US009200944B2

(12) United States Patent
Sivonen et al.

(10) Patent No.: US 9,200,944 B2
(45) Date of Patent: Dec. 1, 2015

(54) METHOD OF OBJECTIVELY DETERMINING SUBJECTIVE PROPERTIES OF A BINAURAL SOUND SIGNAL

(75) Inventors: Ville Pekka Sivonen, Oulu (FI);
Wolfgang Ellermeier, Aabybro (DK);
Soren Bech, Holstebro (DK); Finn Kryger Nielsen, Brondby (DK)

(73) Assignee: Brüel & Kjær Sound & Vibration Measurement A/S, Nærum (DK)

( * ) Notice: Subject to any disclaimer, the term of this patent is extended or adjusted under 35 U.S.C. 154(b) by 2112 days.

(21) Appl. No.: 11/578,773

(22) PCT Filed: Apr. 27, 2005

(86) PCT No.: PCT/DK2005/000287
§ 371 (c)(1),
(2), (4) Date: Dec. 8, 2006

(87) PCT Pub. No.: WO2005/106407
PCT Pub. Date: Nov. 10, 2005

(65) Prior Publication Data
US 2007/0272022 A1    Nov. 29, 2007

(30) Foreign Application Priority Data

Apr. 28, 2004 (DK) .............................. 2004 00663
May 13, 2004 (DK) .............................. 2004 00768

(51) Int. Cl.
*H04R 5/02*        (2006.01)
*G01H 3/10*        (2006.01)
(Continued)

(52) U.S. Cl.
CPC ..... *G01H 3/10* (2013.01); *H04R 3/005* (2013.01); *H04R 5/027* (2013.01); *H04S 2420/01* (2013.01)

(58) Field of Classification Search
CPC ............ H04S 1/00; H04S 1/002; H04S 1/005;
H04S 3/00; H04S 2400/01; H04S 2420/01;
H04R 3/00; H04R 3/005; H04R 5/027;
G01H 3/10
USPC ......... 381/60, 1, 56, 26, 309, 310, 17, 58, 74,
381/95–98; 73/646; 600/559
See application file for complete search history.

(56) References Cited

U.S. PATENT DOCUMENTS 3,920,904 A * 11/1975 Blauert et al. ................ 381/310
4,631,962 A    12/1986 Genuit
(Continued)

FOREIGN PATENT DOCUMENTS

DE        42 22 050 A1    1/1993

OTHER PUBLICATIONS

Headphone simulation of free-field listening I: Stimulus synthesis Author Frederic L Wightman Journal Acoust. Soc. Am. 85 (2) Feb. 1989.*
Zwicker et al.; "Psychoacoustics: Facts and Models"; Springer; 1999; pp. 203-238.
(Continued)

*Primary Examiner* — Xu Mei
(74) *Attorney, Agent, or Firm* — Nixon Peabody LLP

(57) ABSTRACT

For determining a subjective property such as loudness of a binaural sound signal left and right sound pressures in the left and right ears of a human being, resulting from the binaural sound signal, are determined. The left and right sound pressures are frequency analyzed to obtain left and right frequency spectra. In each frequency band, the diotic (common) sound pressure in the left and right ears is determined, which would result from a plane wave frontal incidence on the human being, and that would produce the same perceived loudness as the frequency bandwidth limited left and right sound pressures. In each frequency band the inverse frontal head related transfer functions are used to determine the free-field sound pressure that would produce the same perceived loudness as the diotic sound pressure. The loudness is determined as the loudness of the totality of frequency bandwidth limited free field sound pressures, preferably using the international standard ISO 532.

10 Claims, 1 Drawing Sheet

(51) Int. Cl.
*H04R 3/00* (2006.01)
*H04R 5/027* (2006.01)

(56) References Cited

U.S. PATENT DOCUMENTS

| | | |
|---|---|---|
| 5,173,944 A | 12/1992 | Begault |
| 5,500,900 A | 3/1996 | Chen et al. |
| 5,729,612 A | 3/1998 | Abel et al. |
| 5,910,990 A | 6/1999 | Jang |
| 7,391,876 B2 * | 6/2008 | Cohen et al. ............... 381/309 |

OTHER PUBLICATIONS

Moore et al.; "A Model for the Prediction of Thresholds, Loudness, and Partial Loudness"; J. Audio Eng. Soc.; vol. 45, No. 4; Apr. 1997; pp. 224-239.

Tuomi et al.; "A Real-Time Binaural Loudness Meter"; 139$^{th}$ meeting of the ASA; 2000; pp. 1-7.

Zacharov et al.; "Auditory periphery, HRFT's and directional loudness perception"; Audio Engineering Society 110$^{th}$ Convention; Amsterdam, The Netherlands, May 12-15, 2001; pp. 1-10.

Robinson et al.; "The Loudness of Directional Sound Fields"; Acustica; vol. 10; 1960; pp. 74-80; XP008041609.

* cited by examiner

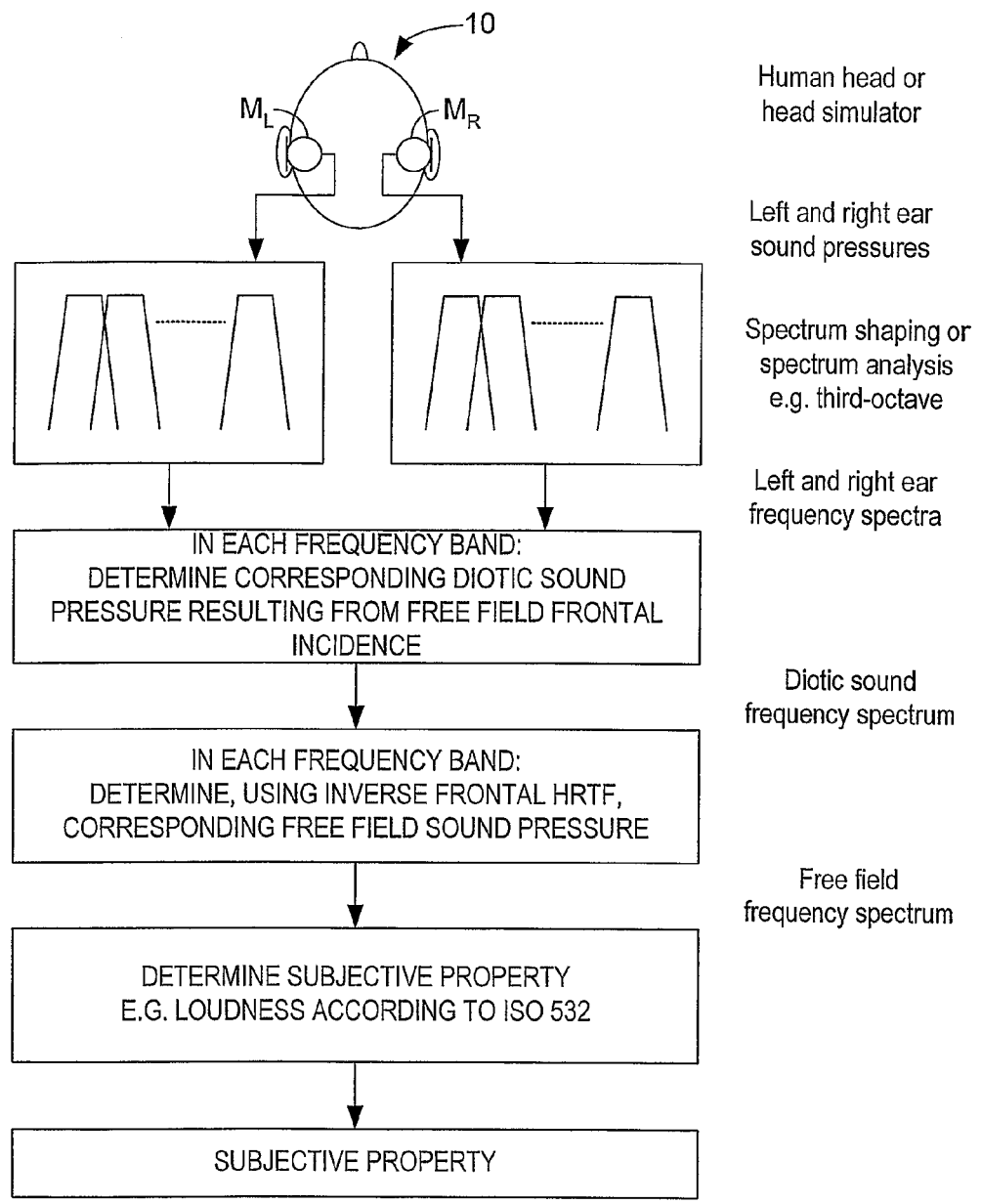

METHOD OF OBJECTIVELY DETERMINING SUBJECTIVE PROPERTIES OF A BINAURAL SOUND SIGNAL

This invention relates to the psycho-acoustic determination of subjective properties such as perceived loudness of a sound signal. Such determinations are useful e.g. in environmental and occupational studies and for determining sound quality.

BACKGROUND OF THE INVENTION

Perceived loudness is a subjective quantity, and methods for objectively determining perceived loudness have been developed. The hearing threshold of human beings depends on frequency, and furthermore, the frequency dependency of equal loudness contours also varies with the sound pressure level.

Sound level meters can have frequency dependent and level-invariant filters for use in different situations when perceived loudness is to be objectively determined. An example is the widely used A-weighting filter for determining noise level in dB(A). Such filters are relatively simple to construct and give accurate and repeatable measurements. However, the level-dependency of the equal loudness contours is not taken into account, and the use of such fixed filters does therefore not give realistic determinations of perceived loudness.

The international standard ISO 532:1975 Acoustics—Method for calculating loudness level issued by the International Organization for Standardization prescribes measurement of the sound, whose loudness is to be determined, using a single microphone placed at the location of interest. A frequency analysis of the measured sound, preferably a third-octave analysis, forms the basis for determining the loudness using level-dependent equal loudness contours.

ISO 532 only determines loudness of a sound field using a single microphone and assumes that the sound signals at the two ears of a human being are the same. This is true only for a free-field sound with direction of incidence in the median plane, such as frontal incidence, and for diffuse field. It is unclear how loudness should be determined from signals that differ at the ears of a listener.

U.S. Pat. No. 4,631,962 discloses an artificial head measuring system composed of geometric bodies for simulating acoustic properties of a human head. Microphones are disposed in the auditory canals of the artificial head.

U.S. Pat. No. 5,729,612 discloses a method and an apparatus for measuring head-related transfer functions, HRTFs.

The problem to be solved by the invention is therefore to provide a method, which can realistically determine the perceived loudness of any binaural sound signal, i.e. free field, diffuse field, reverberant field or any combination thereof, where the sound can be generated by any combination of point sources and distributed sources with any direction of incidence. The term "binaural" is here used about the situation where a person is subjected to such a sound field and receives corresponding sound signals in his or her left and right ears that are modified by the head-related transfer functions. In general the binaural situation thus also includes e.g. free-field frontal incidence and stimulation using a headphone such as "monotic" stimulation of only one ear and uncorrelated signals in the left and right ears.

SUMMARY OF THE INVENTION

The invention solves this problem by providing a method in which first left and right sound pressures in the left and right ears, respectively, of a human being, resulting from the binaural sound signal, are determined. Each of the left and right sound pressures are analyzed in a plurality of frequency bands to obtain left and right frequency spectra comprising a plurality of frequency bandwidth limited left and right sound pressures. In each frequency band, the frequency bandwidth limited diotic (i.e. common) sound pressure in the left and right ears is determined, which would result from a plane wave frontal incidence on the human being, and that would produce the same perceived loudness as the frequency bandwidth limited left and right sound pressures. In each frequency band the inverse frontal head-related transfer function, $HRTF^{-1}$, of either ear is used to determine the frequency bandwidth limited free-field sound pressure that would produce the same perceived loudness as the frequency bandwidth limited diotic sound pressure. Finally, the perceived loudness of the sound signal is determined as the loudness of the totality of frequency bandwidth limited free field sound pressures, preferably using the international standard ISO 532: 1975 Acoustics—Method for calculating loudness level issued by the International Organization for Standardization.

The determination of the frequency bandwidth limited diotic sound pressures is preferably dependent on the levels of the frequency bandwidth limited left and right sound pressures and preferably also on frequency, whereby the method more closely simulates psycho-acoustic perception of loudness.

Preferably, the left and right sound pressures in the left and right ears are determined using a simulator that simulates acoustic properties including the left and right ears of a head of a human being, where left and right microphones, respectively, measure the left and right ear sound pressures. Measurements with such a simulator are realistic and can be repeated with high accuracy.

If such a simulator is not available, the sound pressures in the left and right ears can be determined using a human being, where left and right microphones, respectively, measure the left and right ear sound pressures.

In a more general aspect of the invention each of the left and right sound pressures are frequency weighted using e.g. a standardized weighting filter such as the A-weighting filter to obtain left and right frequency weighted sound pressures. Possibly, the frequency weighting can also be linear, i.e. independent on frequency, within lower and upper frequency limits, such as to be limited to the audible frequency range or a sub-range thereof. A determination is made of the frequency weighted diotic sound pressure in the left and right ears that would result from a plane wave frontal incidence on the human being, and that produces the same subjective property as the frequency weighted left and right sound pressures. The frequency weighted free-field sound pressure that produces the same subjective property as the frequency weighted diotic sound pressure is determined, and the subjective property of the sound signal is determined as the property of the frequency weighted free field sound pressure.

Examples of subjective properties of the sound signal are loudness, sharpness, roughness, fluctuation strength, tonality, speech interference level, spectrum balance, intelligibility (articulation index), kurtosis, prominence ratio, tone-to-noise ratio, and any combination thereof.

BRIEF DESCRIPTION OF THE DRAWING

The FIGURE shows a flow chart illustrating the method of the invention.

DETAILED DESCRIPTION OF THE INVENTION

The invention will be describes with emphasis on its use for determining loudness as an example. It is a basic assumption of the invention that loudness perception is determined only by the sound signals received at the two ears of a listener, i.e. the sound signals as modified by the head-related transfer functions, HRTFs.

In the FIGURE a head 10 is illustrated seen from above. The head 10 is preferably the head of a Head and Torso Simulator type 4100 or type 4128, both from Brüel & Kjaer Sound and Vibration Measurement A/S. The head is shown as seen from above and without a torso and has left and right simulated ears. In each of the simulated ears of the head 10 there is arranged a microphone $M_L$ and $M_R$, respectively, for receiving left and right sound pressures.

In use the simulator 10 is placed at a location where it is desired to objectively determine the loudness of a sound signal. The simulator should be placed in a position that will be, or is suitable for being, occupied by a person who will be exposed to the sound signal, that can be any sound field, i.e. free field, diffuse field or any combination thereof. The left and right microphones output electrical signals representing the sound pressures in the left and right ear, respectively.

Each of the electrical signals representing the left and right ear sound pressures are analyzed for the frequency distribution of the sound signals, preferably in third-octave bands as prescribed in the international standard ISO 532. The frequency analysis thus gives the left and right ear third-octave frequency spectra, which are individual to the left and right ears. Other frequency analyses could also be performed to serve different purposes.

In each third-octave frequency band the left and right ear frequency bandwidth limited signals are used to calculate the frequency bandwidth limited sound pressure in the left and right ears that would result from a plane wave frontal incidence on the human being, and that produces the same perceived loudness as the frequency bandwidth limited left and right sound pressures. This sound pressure is the same in both ears and is referred to as the "diotic" sound pressure. The formula that is used for the conversion is as follows:

$$L_{p,L/R}(f) = A(p, f) \cdot \log_2\left(2^{L_{p,L}(f)/A(p,f)} + 2^{L_{p,R}(f)/A(p,f)}\right) - A(p, f) \quad (1)$$

Where
$L_{p,L/R}(f)$ is the diotic sound pressure level at either ear,
$A(p,f)$ is binaural loudness summation (BLS) in dB,
p is the absolute sound pressure in Pa,
f is the frequency,
$L_{p,L}$ is the sound pressure level at the left ear in dB SPL, and
$L_{p,R}$ is the sound pressure level at the right ear in dB SPL.

Equation (1) converts any binaural stimulation of the left and the right ears to the diotic frontal stimulation that results in the same perceived loudness. In diotic stimulation the signals at the two ears are the same. Therefore, the binaural loudness summation, A(p,f), is subtracted in the conversion formula, since only one at-ear signal is needed for further calculations. This calculation thus gives a plurality of frequency bandwidth limited diotic sound pressures, which together define the diotic sound spectrum that would result at either ear from a free-field frontal incidence sound signal.

Preliminary experiments indicate that the binaural loudness summation, A(p,f), tends to increase with frequency, whereas the level-dependency has not been proven to be significant at levels, where loudness determinations are typically made. An average BLS over different levels and frequencies is a few dB, i.e. in the range of 3-6 dB.

When an object is placed in a sound field, the object will cause disturbances of the sound field. Thus, when a person or a head (and torso) simulator is placed in a free sound field, the person or the simulator disturbs the sound field, and free-field conditions no longer exist around the person or the simulator. This means, that the sound at the left and right ears of the head simulator 10 and at the microphones $M_L$ and $M_R$ do not truly represent the field that would exist without the head or head simulator 10, but the sounds at the left and right ears are modified by the respective head-related transfer function. The concept of head-related transfer functions and an apparatus and a method for their measurement are described in U.S. Pat. No. 5,729,612.

Thus, in order to arrive at the frontal incidence free-field sound spectrum that, when modified by the head-related transfer functions, causes the above calculated diotic sound spectrum, the calculated diotic sound spectrum is modified by the inverse head-related transfer functions. This is done for each frequency bandwidth limited diotic sound pressure to obtain the corresponding frequency bandwidth limited free-field sound pressure. The totality of frequency bandwidth limited free-field sound pressures form the free-field sound signal that causes the same perceived loudness on a human being as the original binaural sound signal.

In the final step of the method of the invention the perceived loudness of the original binaural sound signal is determined as the loudness of the totality of frequency bandwidth limited free field sound pressures, i.e. the thus obtained free-field frequency spectrum is used as input to a loudness calculation method, preferably according to the international standard ISO 532.

REFERENCES

[1] Zwicker, E. & Fastl, H. (1999). Psychoacoustics: Facts and Models, 2nd edition. Springer, Berlin, pp. 203-238.
[2] Moore, B. C., Glasberg, B. R. & Baer, T. (1997). A Model for the Prediction of Thresholds, Loudness and Partial Loudness. J. Audio Eng. Soc., Vol. 45, No. 4, pp. 224-240.
[3] Tuomi, O. & Zacharov, N. (2000). A real-time binaural loudness meter. 139th meeting of the Acoustical Society of America, Atlanta, USA, 7 p.
[4] Zacharov, N., Tuomi, O. & Lorho, G. (2001). Auditory periphery, HRTF's and directional loudness perception. AES 110th Convention, Amsterdam, Netherlands, Paper 5315, 10 p.
[5] Robinson, D. W. & Whittle, L. S. (1960). The loudness of directional sound fields. Acustica vol. 10, pp. 74-80.

The invention claimed is:
1. A method of determining a subjective property of a binaural sound signal, the method comprising
determining left and right sound pressures in the left and right ears, respectively, of a human being, resulting from the binaural sound signal, the binaural sound signal being generated by an arbitrary combination of point sources and distributed sources with an arbitrary direction of incidence, the left sound pressure differing from the right sound pressure,
determining, for each of the left and right sound pressures resulting from the binaural sound signal, left and right frequency spectra each comprising a plurality of frequency bandwidth limited left and right sound pressures,
calculating, in each frequency band, using the determined frequency bandwidth limited left and right sound pressures, the frequency bandwidth limited diotic sound pressure, which is equal in the left and right ears, that would result from a plane wave frontal incidence on a human being, and that produces the same perceived loudness as the frequency bandwidth limited left and right sound pressures, determining, by modifying the frequency bandwidth limited diotic sound pressure with an inverse frontal head-related transfer function, in each frequency band, the frequency bandwidth limited free-field sound pressure that produces the same perceived loudness as the frequency bandwidth limited diotic sound pressure, and determining the subjective property of the sound signal as the property of the totality of frequency bandwidth limited free field sound pressures.

2. A method according to claim 1, wherein the determination of the frequency bandwidth limited diotic sound pressure is dependent on the levels of the frequency bandwidth limited left and right sound pressures.

3. A method according to claim 1, wherein the determination of the frequency bandwidth limited diotic sound pressure is dependent on frequency.

4. A method according to claim 1, wherein the left and right sound pressures in the left and right ears are determined using a simulator simulating acoustic properties including the left and right ears of a head of a human being, where the left and right microphones, respectively, measure the left and right sound pressures.

5. A method according to claim 1, wherein the left and right sound pressures in the left and right ears are determined using a human being, where left and right microphones, respectively, measure the left and right sound pressures.

6. A method according to claim 1, wherein the subjective property is perceived loudness.

7. A method according to claim 1, wherein the subjective property is sharpness or roughness or fluctuation strength or tonality or speech interference level or spectrum balance or intelligibility or articulation index or kurtosis or prominence ratio or tone-to-noise ratio or a combination thereof.

8. A method according to claim 1, wherein the arbitrary sources are capable of producing diotic sound pressures.

9. A method of determining a subjective property of a binaural sound signal, the method comprising determining left and right sound pressures in the left and right ears, respectively, of a human being, resulting from the binaural sound signal, the binaural sound signal being generated by an arbitrary combination of point sources and distributed sources with an arbitrary direction of incidence, the left sound pressure differing from the right sound pressure, determining, for each of the left and right sound pressures resulting from the binaural sound signal, left and right frequency weighted sound pressures, calculating the frequency weighted diotic sound pressure, which is equal in the left and right ears, that would result from a plane wave frontal incidence on the human being, and that produces the same subjective property as the frequency weighted left and right sound pressures, by using the determined frequency weighted limited left and right sound pressures, determining, by modifying the frequency weighted diotic sound pressure with an inverse frontal head-related transfer function, the frequency weighted free-field sound pressure that produces the same subjective property as the frequency weighted diotic sound pressure, and determining the subjective property of the sound signal as the property of the frequency weighted free field sound pressure.

10. A method according to claim 9, wherein the arbitrary sources are capable of producing diotic sound pressures.

* * * * *